(12) United States Patent
Peng

(10) Patent No.: US 10,048,537 B2
(45) Date of Patent: Aug. 14, 2018

(54) LIQUID CRYSTAL DISPLAY APPARATUS

(71) Applicant: Wuhan China Star Optoelectronics Technology Co., Ltd., Wuhan, Hubei (CN)

(72) Inventor: Haibo Peng, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 210 days.

(21) Appl. No.: 15/114,317

(22) PCT Filed: Jun. 29, 2016

(86) PCT No.: PCT/CN2016/087669
§ 371 (c)(1),
(2) Date: Jul. 26, 2016

(87) PCT Pub. No.: WO2017/215036
PCT Pub. Date: Dec. 21, 2017

(65) Prior Publication Data
US 2018/0173054 A1    Jun. 21, 2018

(30) Foreign Application Priority Data
Jun. 17, 2016 (CN) .......................... 2016 1 0437125

(51) Int. Cl.
*G02F 1/133* (2006.01)
*G02F 1/1335* (2006.01)
*G02F 1/017* (2006.01)

(52) U.S. Cl.
CPC ........ *G02F 1/133602* (2013.01); *G02F 1/017* (2013.01); *G02F 1/133514* (2013.01); *G02F 2001/01791* (2013.01)

(58) Field of Classification Search
CPC ......... G02F 1/133602; G02F 1/133514; G02F 1/017
See application file for complete search history.

(56) References Cited

U.S. PATENT DOCUMENTS

2012/0257417 A1* 10/2012 Lee .................. G02B 6/005
                                                    362/622
2014/0204128 A1*  7/2014 Jiang ............... G02F 1/133617
                                                    349/61

(Continued)

*Primary Examiner* — Kevin M Nguyen
(74) *Attorney, Agent, or Firm* — Andrew C. Cheng

(57) ABSTRACT

The present application discloses a liquid crystal display apparatus, includes a backlight source to emit blue light; a composite film layer to receive the blue light and wherein the composite film layer includes an intermediate region, and an edge region, the edge region is disposed around the intermediate region, the intermediate region doped with quantum dot, the edge region doped with phosphors, the composite film layer emit white light after absorbing blue light; and a color filter substrate to receive white light and the color filter substrate includes a color resist layer, wherein the color resist layer includes a first region and a second region, the first region is provided corresponding to the intermediate region, the second region is provided corresponding to the edge region, and the thickness of the first region is smaller than the second thickness of the second region.

11 Claims, 1 Drawing Sheet

(56) References Cited

U.S. PATENT DOCUMENTS

| | | | |
|---|---|---|---|
| 2015/0124195 A1* | 5/2015 | Chen | G02F 1/133512 349/61 |
| 2016/0054624 A1* | 2/2016 | Cho | G02F 1/133605 349/58 |

* cited by examiner

LIQUID CRYSTAL DISPLAY APPARATUS

CROSS REFERENCE

This application claims the priority of Chinese Patent Application No. 201610437125.X, entitled "LIQUID CRYSTAL DISPLAY APPARATUS", filed on Jun. 17, 2016, the disclosure of which is incorporated herein by reference in its entirety.

FIELD OF THE INVENTION

The present application relates to a display technology field, and more particularly to a liquid crystal display apparatus.

BACKGROUND OF THE INVENTION

Quantum dots, QDs, also known as semiconductor nanocrystals. Quantum dots are quasi-zero-dimensional of nano-materials, aggregations of atoms and molecules at the nanometer scale, usually spherical or spherical, and made of a semiconductor material (usually made IIB~VIA or IIIA~VA elements), the stable diameter of the nanoparticle is 2~20 nm. When the quantum dots used in the liquid crystal displays, it can significantly improve the color gamut of the display device and the vividness, and can reduce the energy consumption of the display device. The color gamut of the liquid crystal displays with the application of quantum dots LCD display device can be increased from the current mainstream display of 70% (NTSC standard) to 100% (NTSC standard).

The liquid crystal display device with quantum dot technology, which typically includes a backlight module with a quantum dots film such as the high color gamut quantum dot optical film and a blue light emitting diode, LED backlight source paired with the film. However, due to the sensitive issues of the quantum dots to the water and oxygen, when quantum dots are encapsulated in a film, the edge area of the film will be failure of at least 1 mm in general. It will cause the obvious blue around the edge of the screen when the normal display of the display device and causing the color distortion of entire edge of the screen, thereby greatly reducing the display quality of the display device. This blue light leakage phenomenon is particularly evident in small and medium-sized display device due to the display frame is narrow in the small and medium-sized display device, and it is difficult to block the blue light leakage around the edges of the backlight. Moreover, in recent years, the development of small and medium-size display device is moving to a narrower frame or no frame, which makes the blue light leakage problem more prominent.

SUMMARY OF THE INVENTION

The technology problem to be solved by the present application is to provide a liquid crystal display apparatus, the different display area of the liquid crystal display apparatus of the present application can display close or the same color.

In order to achieve the purpose mentioned above, the technology approach is adapted in the embodiment of the present application:

A liquid crystal display apparatus is provided and includes:

A backlight source to emit blue light;

A composite film layer to receive the blue light and wherein the composite film layer comprising an intermediate region, and an edge region, the edge region is disposed around the intermediate region, the intermediate region doped with quantum dot, the edge region doped with phosphors, the composite film layer emit white light after absorbing blue light; and A color filter substrate to receive white light and the color filter substrate comprising a color resist layer, wherein the color resist layer comprising a first region and a second region, the first region is provided corresponding to the intermediate region, the second region is provided corresponding to the edge region, and the thickness of the first region is smaller than the second thickness of the second region.

Wherein the vertical projection of the first region on the composite film layer is overlapped with the intermediate region, the vertical projection of the second region on the composite film layer is overlapped with the edge region.

Wherein the thickness of the first region is at least 0.2 µm smaller than the thickness of the second region.

Wherein the thickness of the first region is 2.0 µm to 2.8 µm, the thickness of the second region is 2.4 µm to 2.8 µm.

Wherein the thickness of the first region is 2.4 µm, the thickness of the second region is 2.8 µm.

Wherein the width of the edge region is larger or equal to 1 mm.

Wherein the width of the edge region is smaller or equal to 2 mm.

Wherein the phosphor comprising a red phosphor and a green phosphor, the red phosphor emits red light after absorbing the blue light, the green phosphor emits green light after absorbing the blue light, and the red light and the green light in combination with the blue light to white light.

Wherein the quantum dots comprising red quantum dots and green quantum dots, the red quantum dots emits red light after absorbing the blue light, the green quantum dots emits green light after absorbing the blue light, the red light and the green light in combination with the blue light to white light.

Wherein the size of the red quantum dots and green quantum dots is different.

comparing to the conventional technology, the present application has the following advantage:

In the liquid crystal display apparatus of this embodiment of the present invention, the intermediate region of the composite film layer is as the main display area, and is doped with the quantum dot, that is greatly increase in the color gamut and vividness of the liquid crystal display apparatus and reduces the energy consumption of the liquid crystal display apparatus. The edge region of the composite film layer is provided around the intermediate region, the edge region is doped with phosphor, so that the edge region can normally display, and it is possible to exclude oxygen and heat and achieve the function to protect the intermediate region. Meanwhile, since the color liquid crystal display apparatus divides the color resist layer on the color filter substrate into the first region and the second region, wherein the first region is corresponding to the intermediate region, and the second region is corresponding to the edge region. The thickness of the first region of the color filter substrate is smaller than the second thickness of the second region, therefore the color filter substrate can coupled with the different luminescent properties of the quantum dots and the phosphor of the composite film layer, so that the different display area of the liquid crystal display apparatus can display close or the same color.

BRIEF DESCRIPTION OF THE DRAWINGS

In order to more clearly illustrate the embodiments of the present application or prior art, the following figures will be described in the embodiments are briefly introduced. It is obvious that the drawings are merely some embodiments of the present application, those of ordinary skill in this field can obtain other figures according to these figures without paying the premise.

DETAILED DESCRIPTION OF PREFERRED EMBODIMENTS

Figure 1:
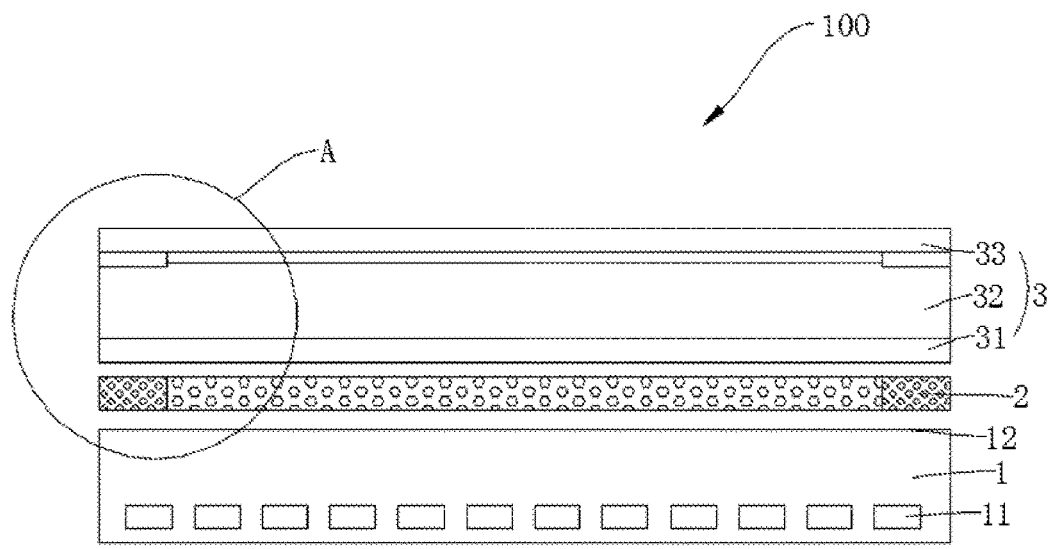
FIG. 1 illustrates a schematic structure of a liquid crystal display apparatus according to the embodiment of the present application.

Embodiments of the present application are described in detail with the technical matters, structural features, achieved objects, and effects with reference to the accompanying drawings as follows. It is clear that the described embodiments are part of embodiments of the present application, but not all embodiments. Based on the embodiments of the present application, all other embodiments to those of ordinary skill in the premise of no creative efforts obtained should be considered within the scope of protection of the present application.

Specifically, the terminologies in the embodiments of the present application are merely for describing the purpose of the certain embodiment, but not to limit the invention. Examples and the claims be implemented in the present application requires the use of the singular form of the book "an", "the" and "the" are intend to include most forms unless the context clearly dictates otherwise. It should also be understood that the terminology used herein that "and/or" means and includes any or all possible combinations of one or more of the associated listed items.

Additionally, the following description of the embodiments with reference to the attached diagram for illustrating particular embodiments may be used to embodiments of the present invention. The direction of the present invention mentioned, for example, "upper", "lower", "front", "rear", "left", "right", "inside", "outside", "side" and so on, can only with reference to the direction of the accompanying drawings. Thus, the terms of the direction used is in order to better and more clearly illustrate and understanding the present invention, rather than indicating device or element or imply referred to must have a specific orientation, with particular orientation construction and operation, and therefore can not be construed as limiting the present invention.

In the description of the present invention, it should be noted that, unless clearly defined and limited, the term "mounted," "connected," "connected," "disposed on . . . " should be broadly understood. For example, can be fixed connection, can be removable attached or integrally connected; can be mechanically connected; it can be directly connected, or may be connected indirectly through intermediaries, two elements may be in communication with the interior. Those of ordinary skill in the art, the term can be understood that the above circumstances in the specific meaning of the present invention. Further, in the description of the present invention, unless otherwise specified, "plurality" means two or more. If the term "step" in the present specification appear, which means not only a separate step, while no clear distinction with other processes, this step can be realized as long as the intended function is also included in the parlance. In this specification, by "~" indicates the numerical range means that the "-" values before and after, respectively, as described, including the maximum and minimum values of the range. In the drawings, similar or identical structural units represented by the same reference numerals.

Figure 2:
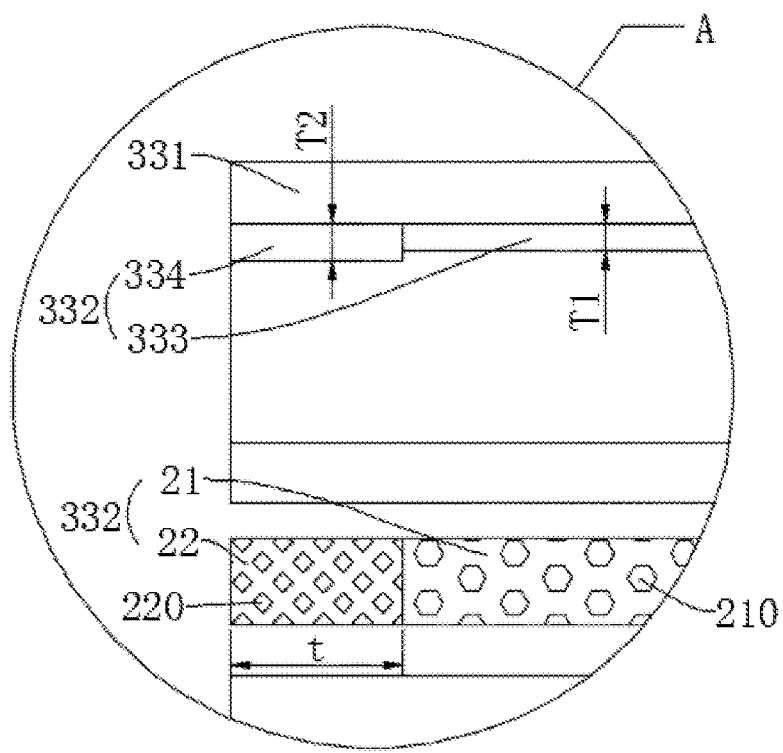
FIG. 2 illustrated an enlarged structure of the A site of FIG. 1.

Referring to FIGS. 1 and 2, a liquid crystal display apparatus 100 is provided in the embodiment of the invention, includes a backlight module 1, a composite film layer 2 and a liquid crystal cell 3. The composite film layer 2 is disposed between the backlight module 1 and the liquid crystal cell 3 for receiving and converting the light emitted from the backlight module 1, and emits a new light to the liquid crystal cell 3. Wherein the backlight module 1 includes a backlight 11, the backlight source 11 to emit blue light, that is, the backlight module 1 emits blue light. The composite film layer 2 is disposed to face the light emitting surface 12 of the backlight module 1 to receive the blue light. The composite film layer 2 includes an intermediate region 21, and an edge region 22, the edge region 22 is disposed around the intermediate region 21, the intermediate region 21 doped with quantum dot 210, the edge region 22 doped with phosphors 220, the intermediate region 21 and the 22 edge region absorb the blue light and later emit the white light, such as the composite film layer 2 emits white light after absorbing the blue light. The liquid crystal cell 3 is disposed to face the composite film layer 2 and to receive the white light. The liquid crystal cell 3 includes an array substrate 31, a liquid crystal layer 32 and a color filter substrate 33 stacked disposed sequentially. The color filter substrate 33 includes a substrate 331 and a color resist layer 332 disposed on the substrate 331, wherein the color resist layer 332 includes a first region 333 and a second region 334. The first region 333 is provided corresponding to the intermediate region 21, the second region 334 is provided corresponding to the edge region 22, i.e., the second region 334 is disposed around the first region 333, the thickness T1 of the first region 333 is smaller than the second thickness T2 of the second region 334.

In this embodiment, the intermediate region 21 of the composite film layer 2 is as the main display area, and is doped with the quantum dot 210, that is greatly increase in the color gamut and vividness of the liquid crystal display apparatus 100 and reduces the energy consumption of the liquid crystal display apparatus 100. The edge region 22 of the composite film layer 2 is provided around the intermediate region 21, the edge region 22 is doped with phosphor 220, so that the edge region 22 can normally display, and it is possible to exclude oxygen and heat and achieve the function to protect the intermediate region 21. Meanwhile, since the color liquid crystal display apparatus 100 divides the color resist layer 332 on the color filter substrate 33 into the first region 333 and the second region 334, wherein the first region 333 is corresponding to the intermediate region 21, and the second region 334 is corresponding to the edge region 22. The thickness T1 of the first region 333 of the color filter substrate 33 is smaller than the second thickness T2 of the second region 334, therefore the color filter substrate 33 can coupled with the different luminescent properties of the quantum dots 210 and the phosphor 220 of the composite film layer 2, so that the different display area of the liquid crystal display apparatus 100 can display close or the same color.

It should be understood that, the "corresponding to" in this embodiment refers to the relative set with identical or similar size, in particular: "the first region 333 is set corresponding to the intermediate region 21" means that the first region 333 is disposed opposite to the intermediate region 21, the size of the first region 333 vertically projected on the composite film layer 2 is identical or similar to the size of the intermediate region 21; "the second region 334 is set corresponding to the edge region 22" means that the second region 334 is disposed opposite to the edge region 22, the size of the second region 334 vertically projected on the composite film layer 2 is identical or similar to the size of the edge region 22.

Further, as an alternative embodiment, the vertical projection of the first region 333 on the composite film layer 2 is overlapped with the intermediate region 21. The vertical projection of the second region 334 on the composite film layer 2 is overlapped with the edge region 22, so that the better the display quality of the liquid crystal display apparatus 100.

Further, as an alternative embodiment, in order to obtain a good display effect, the thickness T1 of the first region 333 of the liquid crystal display apparatus 100 is at least 0.2 μm smaller than the thickness T2 of the second region 334.

Further, as an alternative embodiment, in order to obtain a good display, the range of the thickness T1 of the first region 333 is 2.0 μm to 2.8 μm, the range of thickness T2 of the second region 334 is 2.4 μm to 2.8 μm.

Further, referring to FIG. 2, as an alternative embodiment, the width t of the edge region 22 is larger or equal to 1 mm, to reliably exclude the water, oxygen and hot from the intermediate region 21 by the edge region 22. The "width" in the present embodiment refers to the distance between the edge of the intermediate region 21 to the edge of the composite film layer 2.

Meanwhile, the width t of the edge region 22 is smaller or equal to 2 mm, such that the area ratio of the intermediate region 21 and the edge region 22 is larger, and ensure a high color gamut and color vividness of the liquid crystal display apparatus 100.

Further, as an alternative embodiment, the phosphor 220 of the present embodiment includes a red phosphor and a green phosphor. The red phosphor emits red light after absorbing the blue light, the green phosphor emits green light after absorbing the blue light, the red light and the green light in combination with the blue light to white light.

Preferably, the emission wavelength of the red phosphor is 630 nm~680 nm, the emission wavelength of the green phosphor is 510 nm~540 nm.

Further, as an alternative embodiment, the quantum dots 210 include red quantum dots and green quantum dots, the red quantum dots emits red light after absorbing the blue light, the green quantum dots emits green light after absorbing the blue light, the red light and the green light in combination with the blue light to white light.

Preferably, the size of the red quantum dots and the size of the green quantum dots are different. That is, when the blue light excites the quantum dots 210, since the size of the red quantum dot and the green quantum dot is not the same, the red light with different wavelength and the blue light with different wavelength will be emitted separately. The size of the red quantum dots is larger than the size of the green quantum dots.

For example, referring to FIGS. 1 and 2, the material of the red phosphor is CaS:Eu, the material of the green phosphor is SrGa2S4:Eu. The material of the quantum dot 210 is CdSe@ZnS or CdS@CdTe. The size of the red quantum dots is less or equal to 7 nm, the size of the green quantum dots is less or equal to 2 nm. The thickness T1 of the first region 333 is 2.4 μm, the thickness T2 of the second region 334 is 2.8 μm. In this case, the color gamut ratio of the liquid crystal display apparatus 100 of the present embodiment to the conventional liquid crystal display apparatus 100 is up to 115% (NTSC standard).

Above are embodiments of the present application, which does not limit the scope of the present application. Any modifications, equivalent replacements or improvements within the spirit and principles of the embodiment described above should be covered by the protected scope of the invention.

What is claimed is:

1. A liquid crystal display apparatus, comprising:
    a backlight source to emit blue light;
    a composite film layer to receive the blue light and wherein the composite film layer comprising an intermediate region, and an edge region, the edge region is disposed around the intermediate region, the intermediate region doped with quantum dot, the edge region doped with phosphors, the composite film layer emit white light after absorbing the blue light; and
    a color filter substrate to receive the white light and the color filter substrate comprising a color resist layer, wherein the color resist layer comprising a first region and a second region, the first region is provided corresponding to the intermediate region, the second region is provided corresponding to the edge region, and the thickness of the first region is smaller than the second thickness of the second region.

2. The liquid crystal display apparatus according to claim 1, wherein the vertical projection of the first region on the composite film layer is overlapped with the intermediate region, the vertical projection of the second region on the composite film layer is overlapped with the edge region.

3. The liquid crystal display apparatus according to claim 1, wherein the thickness of the first region is at least 0.2 μm smaller than the thickness of the second region.

4. The liquid crystal display apparatus according to claim 1, wherein the thickness of the first region is 2.0 μm to 2.8 μm, the thickness of the second region is 2.4 μm to 2.8 μm.

5. The liquid crystal display apparatus according to claim 3, wherein the thickness of the first region is 2.4 μm, the thickness of the second region is 2.8 μm.

6. The liquid crystal display apparatus according to claim 4, wherein the thickness of the first region is 2.4 μm,the thickness of the second region is 2.8 μm.

7. The liquid crystal display apparatus according to claim 1, wherein the width of the edge region is larger or equal to 1 mm.

8. The liquid crystal display apparatus according to claim 7, wherein the width of the edge region is smaller or equal to 2 mm.

9. The liquid crystal display apparatus according to claim 1, wherein the phosphor comprising a red phosphor and a green phosphor, the red phosphor emits red light after absorbing the blue light, the green phosphor emits green light after absorbing the blue light, and the red light and the green light in combination with the blue light to white light.

10. The liquid crystal display apparatus according to claim 1, wherein the quantum dots comprising red quantum dots and green quantum dots, the red quantum dots emits red light after absorbing the blue light, the green quantum dots emits green light after absorbing the blue light, the red light and the green light in combination with the blue light to white light.

11. The liquid crystal display apparatus according to claim 10, wherein the size of the red quantum dots and green quantum dots is different.

\* \* \* \* \*